United States Patent
Ohkubo

[11] Patent Number: 6,016,964
[45] Date of Patent: Jan. 25, 2000

[54] AIR-MIX DOOR CONTROL DEVICE FOR AUTOMOBILE AIR-CONDITIONING SYSTEM

[75] Inventor: Masashi Ohkubo, Oaza-Sendai, Japan

[73] Assignee: Zexel Corporation, Tokyo, Japan

[21] Appl. No.: 09/059,255

[22] Filed: Apr. 14, 1998

[30] Foreign Application Priority Data

Apr. 21, 1997 [JP] Japan .................................... 9-117516

[51] Int. Cl.$^7$ .................................................. G05D 23/00
[52] U.S. Cl. ......................... 236/13; 165/202; 165/298; 62/131
[58] Field of Search ............................. 236/13; 165/202, 165/297, 298, 42, 43; 62/244, 131, 187

[56] References Cited

U.S. PATENT DOCUMENTS

| | | | |
|---|---|---|---|
| 4,840,308 | 6/1989 | Akabane et al. | 236/13 |
| 4,852,361 | 8/1989 | Oike | 62/131 |
| 4,899,930 | 2/1990 | Kagohata et al. | 236/91 F |
| 4,930,567 | 6/1990 | Akabane et al. | 165/25 |
| 4,974,776 | 12/1990 | Oshizawa | 236/13 |
| 5,908,154 | 6/1999 | Sunaga et al. | 236/49.3 |

*Primary Examiner*—Henry Bennett
*Assistant Examiner*—Marc Norman

[57] ABSTRACT

An air-mix door control device for an automobile air-conditioning system home-position-sets the air-mix door for the full-hot position or the full-cool position when it is necessary to control an air-mix door for a new target opening position other than a full-hot position or a full-cool position under a condition that an opening position detecting unit for detecting an opening position of the air-mix door causes a trouble. Also, the air-mix door control device calculates a reverse drive time required for reversely driving the air-mix door from the home-position-set position to the new target opening position so as to correct a time error derived from a torque variation of an air-mix door motor actuator due to a battery voltage. Thus, the air-mix door control device reversely drives the air-mix door according to the reverse drive time and controls the air-mix door for the new target opening position. Thereby, even when the opening position detecting unit causes a trouble, the air-mix door is controlled for the new target opening position and a comfortable air-conditioning feeling can be secured.

11 Claims, 6 Drawing Sheets

AIR-MIX DOOR CONTROL DEVICE FOR AUTOMOBILE AIR-CONDITIONING SYSTEM

BACKGROUND OF THE INVENTION

The present invention relates to an air-mix door control device for an automobile air-conditioning system.

In an automobile air-conditioning system, an actual opening position of an air-mix door which adjusts a mix ratio of cold air and warm air is detected by a potentiometer, for example, and based on this detection, a motor actuator which drives the air-mix door is controlled so that the air-mix door reaches a target opening position. Because of this, if the potentiometer causes trouble due to some reason, it is not possible to detect the actual opening position of the air-mix door, disabling a control to the target opening position of the air-mix door, and thus a significant hitch occurs in air-conditioning control.

From the viewpoint as described above, in a prior art, when potentiometer for detecting an actual opening position of an air-mix door causes a trouble, the air-mix door is driven forcibly to a full-hot position or a full-cool position based on whether a target opening position of the air-mix door is in a full-hot direction or a full-cool direction. That is, the air-mix door is driven forcibly to a full-hot position when the target opening position is in a full-hot side, and is driven forcibly to a full-cool position when the target opening position is in a full-cool side. By this, it is designed to secure at least cooling or heating.

However, according to a method like this, since the air-mix door is only driven forcibly to the full-hot position or the full-cool position in the case of potentiometer trouble, there is a problem that an air-conditioning feeling is noticeably compromised.

SUMMARY OF THE INVENTION

It is an object of the present invention to provide a new and improved air-mix door control device for an automobile air-conditioning system.

Another object of the present invention is to provide an air-mix door control device for an automobile air-conditioning system which makes it possible to secure a comfortable air-conditioning feeling even if an opening position detecting means, such as a potentiometer for detecting an actual opening position of an air-mix door, causes trouble.

The above and other objects are attained by an air-mix door control device for an automobile air-conditioning system, having an opening position detecting means for detecting an opening position of an air-mix door, and controlling a motor actuator based on an opening position signal from an opening position detecting means so that said air-mix door is at a target opening position, comprising: a trouble detecting means for detecting a trouble of said opening position detecting means; a home-position setting means, responsive to a trouble detection of said trouble detecting means, for home-position-setting said air-mix door for a full-hot position or a full-cool position by controlling said motor actuator when it is necessary to control said air-mix door for a new target opening position other than the full-hot position or the full-cool position; a reverse drive time calculating means, responsive to said home-position setting means, for setting a reverse opening angle width of said air-mix door from the home-position-set position to the new target opening position, recognizing a current battery voltage, and calculating a reverse drive time required for reversely rotating said air-mix door by the reverse opening angle width based on the reverse opening angle width and the current battery voltage so as to correct a time error derived from a torque variation of said motor actuator due to a battery voltage; and a reverse driving means, responsive to said reverse drive time calculating means, for reversely driving said air-mix door by the reverse drive time by controlling said motor actuator.

According to a composition like this, when it is necessary to control the air-mix door for the new target opening position other than the full-hot position or the full-cool position in case that the opening position detecting means for detecting the opening position of the air-mix door causes a trouble, the air-mix door is home-position-set for the full-hot or full-cool position. Then, the reverse drive time required for reversely driving the air-mix door from the home-position-set position to the new target opening position is calculated so that a time error derived from a torque variation of the motor actuator due to a battery voltage is corrected, and the air-mix door is reversely driven according to the reverse drive time. Because of this, even when the opening position detecting means causes a trouble, the air-mix door is controlled for the new target opening position, and a comfortable air-conditioning feeling can be secured. Further, each time it is necessary to control the air-mix door for the new target opening position other than the the full-hot position and full-cool position, the home-position setting of the air-mix door is executed, and the reverse drive time is calculated so that a time error derived from a torque variation in the motor actuator due to a battery voltage is corrected. Thus, a positional error of the air-mix door can effectively be prevented.

BRIEF DESCRIPTION OF THE DRAWINGS

The foregoing and other objects, features and attendant advantages of the present invention will be appreciated and better understood by means of the following description and accompanying drawings, which are given by way of illustration only and thus are not limitative of the present invention and wherein.

DETAILED DESCRIPTION OF THE INVENTION

Figure 1:
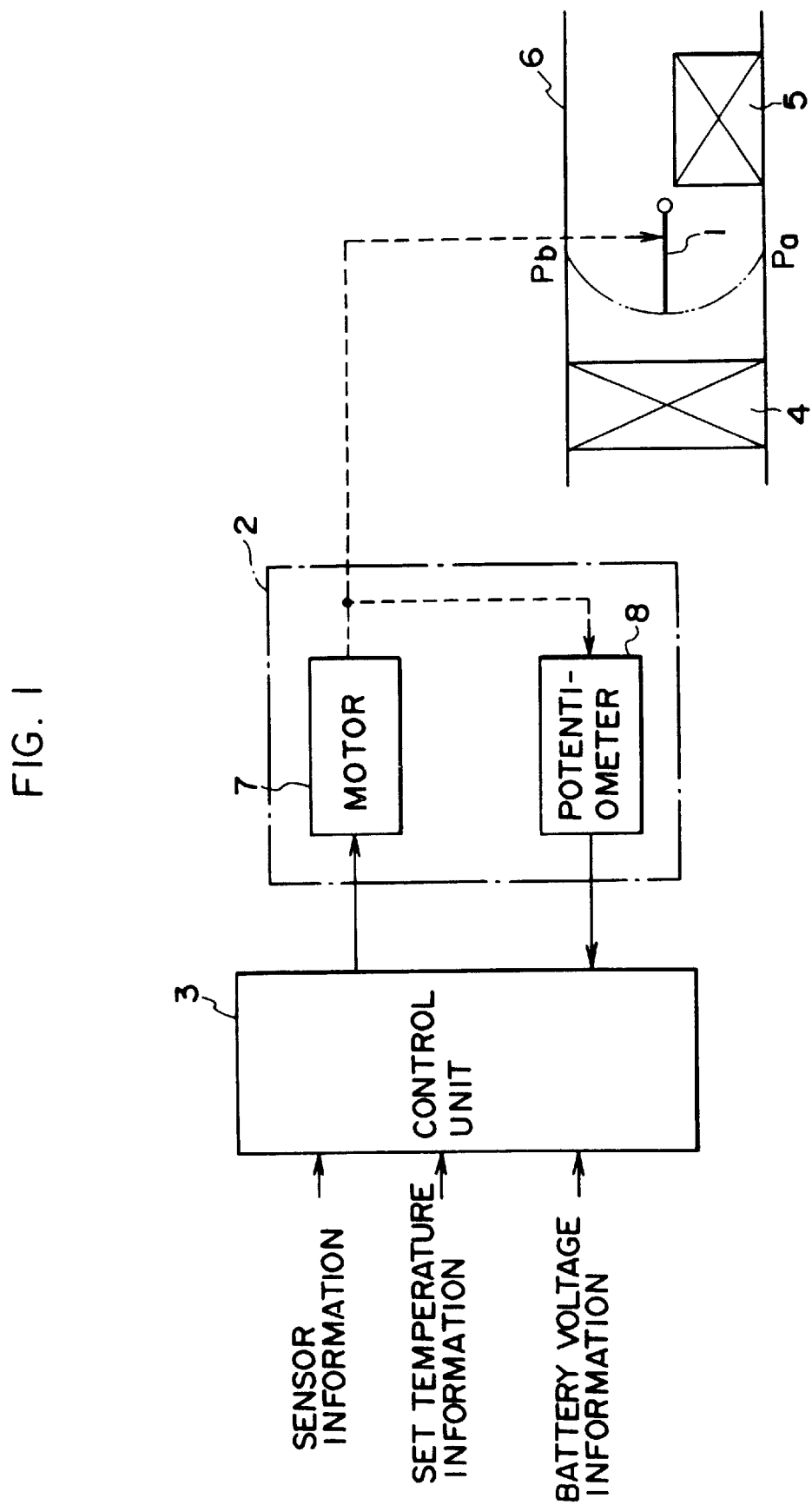
FIG. 1 is a block diagram showing an embodiment of an air-mix door control device according to the present invention.

In FIG. 1, a reference numeral 1 is an air-mix door, a reference numeral 2 is a motor actuator, and a reference numeral 3 is a control unit.

The air-mix door 1 is provided in a duct 6 between an evaporator 4 and a heater core 5, and adjusts a mix ratio of cold air and warm air according to its opening position between a full-cool position Pa and a full-hot position Pb. That is, when the opening position of the air-mix door 1 is controlled for the full-cool position Pa, the cold air provided from the evaporator 4 is sent totally downstream without providing it to the heater core 5. When the opening position of the air-mix door 1 is controlled for the full-hot position Pb, the cold air provided from the evaporator 4 is sent totally downstream through the heater core 5. When the opening position of the air-mix door 1 is controlled between the full-cool position Pa and the full-hot position Pb, the cold air and the warm air are mixed according to the opening position and mixed air is sent downstream. In this embodiment, the opening position of the air-mix door 1 is 0% at the full-cool position Pa and 100% at the full-hot position Pb. The air-mix door 1 is designed to be driven by the motor actuator 2 by way of a link mechanism which is not shown in the drawings.

The motor actuator 2 has a motor 7 for driving the air-mix door 1 and a potentiometer 8 for detecting an actual opening position of the air-mix door 1. The motor 7 is controlled by the control unit 3, and the potentiometer 8 gives an opening position signal representative of the actual opening position of the air-mix door 1 to the control unit 3. The potentiometer 8 outputs the opening position signal within a prescribed voltage range corresponding to an opening position 0%–100% of the air-mix door 1 when the potentiometer 8 is in normal condition. If any trouble occurs due to disconnection, short-circuit and so on, the potentiometer 8 gives the opening position signal without the prescribed voltage range.

The control unit 3, in addition to the opening position signal from the potentiometer 8, inputs sensor informations, a set temperature information and a battery voltage information. The sensor informations include a room temperature of an automobile, an atmospheric temperature outside of the automobile, a quantity of solar radiation which the automobile receives, and so on. When the potentiometer 8 is in normal condition, the control unit 3 executes a normal control so that the air-mix door 1 is at a target opening position based on the opening position signal of the potentiometer 8. If the potentiometer 8 causes trouble, the control unit 3 executes a control so that the air-mix door 1 is at the target opening position without using the opening position signal of the potentiometer 8 according to flow diagrams mentioned later.

Figure 2:
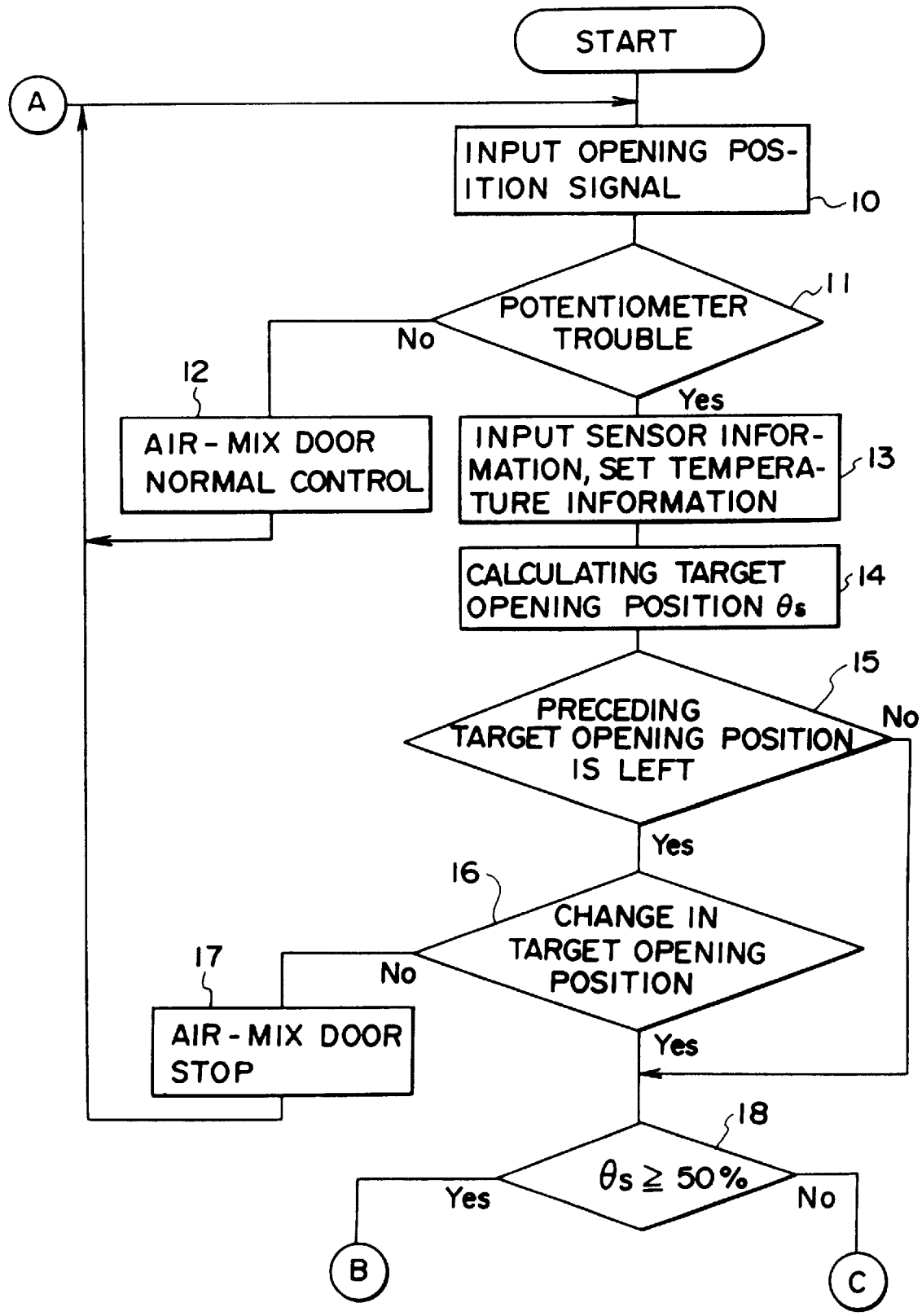
FIG. 2 and FIG. 3 are flow diagrams of a control unit of FIG. 1.
Figure 3:
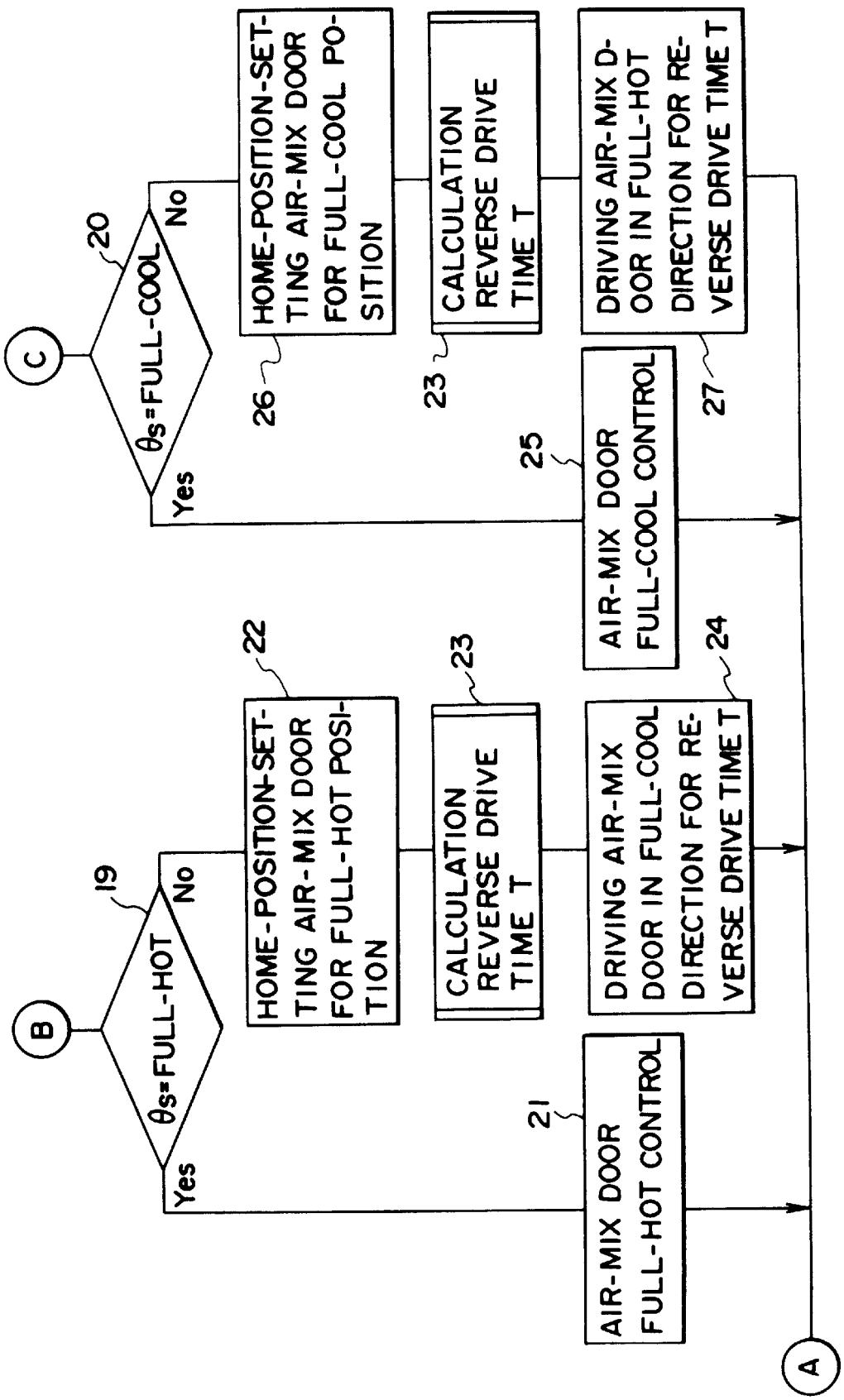
Figure 4:
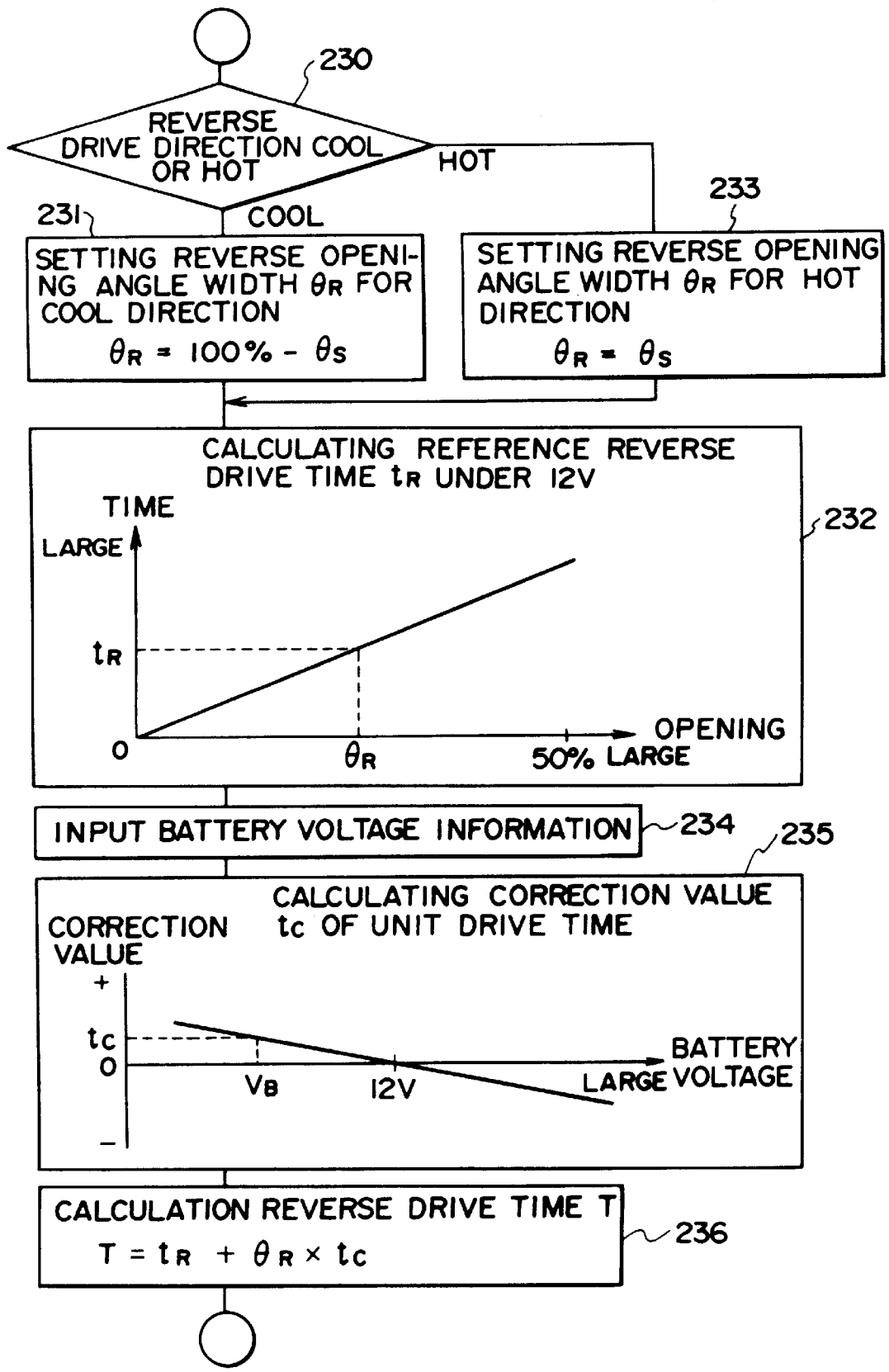
FIG. 4 is a flow diagram of the control unit of FIG. 1 showing a processing of step 23 of FIG. 3.

FIG. 2, FIG. 3 and FIG. 4 are flow diagrams of the control unit 3 of FIG. 1. Terminals A, B and C of FIG. 2 are connected to corresponding terminals A, B and C of FIG. 3. FIG. 4 shows a processing of reverse drive time calculation in a step 23 of FIG. 3.

When air-conditioning control is started, the control unit 3 inputs the opening position signal of the potentiometer which represents the actual opening position of the air-mix door 1 in a step 10, and in a following step 11, decides whether the potentiometer 8 is in trouble. Trouble or normal is, as described above, decided based on whether the opening position signal is within the prescribed voltage range. If the opening position signal is within the prescribed voltage range, the condition of potentiometer 8 is decided as normal. If the opening position signal is without the prescribed voltage range, the condition of potentiometer 8 is decided as trouble. When the potentiometer 8 is decided to be normal in the step 11, the control unit 3 enters from the step 11 to a step 12. In the step 12, the air-mix door 1 is normal-controlled as is well-known. That is, the target opening position of the air-mix door 1 is calculated based on the sensor informations and the set temperature information so that a room temperature of the automobile is a set temperature, and the motor actuator 2 is controlled by the control unit 3 based on the opening position signal of the potentiometer 8 so that the air-mix door 1 is at the target opening position. Thereafter, the control unit 3 returns to the step 10.

In the step 11, when the potentiometer 8 is decided to be in trouble, the control unit 3 enters from the step 11 to a step 13. In the step 13, the control unit 3 inputs the sensor informations and the set temperature information, and in a following step 14, calculates a new target opening position $\theta_S$ of the air-mix door 1 based on the sensor informations and the set temperature information so that a room temperature of the automobile is a set temperature. It then enters a step 15.

In the step 15, the control unit 3 decides whether a preceding target opening position is left in the control unit 3. If the potentiometer 8 causes trouble during air-conditioning control, the preceding target opening position is left in the control unit 3 by the normal control of step 12. Whereas, if an ignition switch (not shown in the drawings) of the automobile is made to be on and air-conditioning control is started under a trouble condition of the potentiometer 8, the control unit 3 enters the step 15 without passing through the normal control of step 12. Because of this, since the preceding target opening position is evaporated by an off of the ignition switch, the preceding target opening position is not left in the control unit 3. When the preceding target opening position is left, the control unit 3 enters from the step 15 to a step 16. In the step 16, the control unit 3 decides whether there is any change between the new target opening position $\theta_S$ calculated in the step 14 and the preceding target opening position. When there is not any change between the new target opening position $\theta_S$ and the preceding target opening position, the control unit 3 enters from the step 16 to a step 17, and returns to the step 10 without driving the air-mix door 1. When there is any change between the new target opening position $\theta_S$ and the preceding target opening position, the control unit 3 enters from the step 16 to a step 18. When no preceding target opening position is left in the step 15, the control unit 3 directly enters from the step 15 to the step 18.

In the step 18, the control unit 3 decides whether the new target opening position $\theta_S$ is more than 50%, in other words, the new target opening position $\theta_S$ is on the full-cool side or on the full-hot side. As described above, in this embodiment, the full-cool position Pa is the 0% opening position, and the full-hot position Pb is the 100% opening position. Therefore, when the new target opening position $\theta_S$ is $\theta_S \geq 50\%$, it is decided to be on the full-hot side. When the new target opening position $\theta_S$ is not $\theta_S \geq 50\%$, it is decided to be on the full-cool side. When $\theta_S \geq 50\%$, that is, when the new target opening position $\theta_S$ is on the full-hot side, the control unit 3 enters from the step 18 to a step 19 of FIG. 3. When $\theta_S < 50\%$, that is, when the new target opening position $\theta_S$ is on the full-cool side, the control unit 3 enters from the step 18 to a step 20 of FIG. 3.

In the step 19, the control unit 3 decides whether the new target opening position $\theta_S$ is at the full-hot position Pb, that is, whether the new target opening position $\theta_S$ is at the 100% opening position. When the new target opening position $\theta_S$ is 100%, the control unit 3 enters from the step 19 to a step 21, controls the air-mix door 1 for the full-hot position Pb by driving the motor actuator 2, and then returns to the step 10 of FIG. 2. In the full-hot control of step 21, driving voltage is impressed to the motor actuator 2 during a prescribed time so that the air-mix door 1 rotates to the full-hot position Pb. The prescribed time is determined based on a time required for rotating the air-mix door 1 from the full-cool position Pa (or the full-hot position Pb) to the full-hot position Pb (or the full-cool position Pa). In order to surely maintain the air-mix door 1 at the full-hot position Pb until the full-hot control is canceled after the air-mix door 1 is rotated to the full-hot position Pb, pulse voltages with a prescribed duty ratio are impressed to the motor actuator 2. The pulse voltages have a mean voltage lower than the driving voltage.

On the other hand, when the new target opening position $\theta_S$ is not in the full-hot position Pb in the step 19, the control unit 3 enters from the step 19 to a step 22, and home-position-sets the air-mix door 1 for the full-hot position Pb. In the home-position setting for the full-hot position Pb of the step 22, the motor actuator 2 is driven during the prescribed time so that the air-mix door 1 is rotated to the full-hot position Pb, and thus the air-mix door 1 is home-position-set for the full-hot position Pb. The prescribed time, as described above, is determined based on a time required for rotating the air-mix door 1 from the full-cool position Pa (or the full-hot position Pb) to the full-hot position Pb (or the full-cool position Pa). In the step 22, pulse voltages like that of the full-hot control of the step 21 is not given to the motor actuator 2, and the motor actuator 2 is stopped after a driving for the prescribed time. After the home-position setting of the air-mix door 1 of the step 22, the control unit 3 enters a step 23, and calculates a reverse drive time T required for driving the air-mix door 1 from the full-hot position Pb to the new target opening position $\theta_S$ in a cooling direction in accordance with the flow diagram of FIG. 4 mentioned later. Thereafter, the control unit 3 enters a step 24, and drives the motor actuator 2 during the reverse drive tine T calculated in the step 23 so that the air-mix door 1 is rotated towards a full-cool side. Thereby, the air-mix door 1 is controlled for the the new target opening position $\theta_S$. After that, the control unit 3 returns to the step 10 of FIG. 2.

In the step 20, the control unit 3 decides whether the new target opening position $\theta_S$ is at the full-cool position Pa, that is, whether the new target opening position $\theta_S$ is at the 0% opening position. When the new target opening position $\theta_S$ is 0%, the control unit 3 enters from the step 20 to a step 25, controls the air-mix door 1 for the full-cool position Pa by driving the motor actuator 2, and then returns to the step 10 of FIG. 2. In the full-cool control of step 25, driving voltage is impressed to the motor actuator 2 during the prescribed time so that the air-mix door 1 rotates to the full-cool position Pa. Thereafter, in order to surely maintain the air-mix door 1 at the full-cool position Pa until the full-cool control is canceled, pulse voltages with the prescribed duty ratio are impressed to the motor actuator 2. The pulse voltages, as described above, have the mean voltage lower than the driving voltage.

On the other hand, when the new target opening position $\theta_S$ is not the full-cool position Pa in the step 20, the control unit 3 enters from the step 20 to a step 26, and home-position-sets the air-mix door 1 for the full-cool position Pa. In the home-position setting for the full-cool position Pa of the step 26, the motor actuator 2 is driven during the prescribed time so that the air-mix door 1 is rotated to the full-cool position Pa, and thus the air-mix door 1 is home-position-set for the full-cool position Pa. In the step 26, pulse voltages like that of the full-cool control of the step 25 is not given to the motor actuator 2, and the motor actuator 2 is stopped after a driving for the prescribed time. After the home-position setting of the air-mix door 1 of the step 26, the control unit 3 enters the step 23, and calculates the reverse drive time T required for driving the air-mix door 1 from the full-cool position Pa to the new target opening position $\theta_S$ in a heating direction in accordance with the flow diagram of FIG. 4 mentioned later. Thereafter, the control unit 3 enters a step 27, and drives the motor actuator 2 during the reverse drive time T calculated in the step 23 so that the air-mix door 1 is rotated towards the full-hot side. Thereby, the air-mix door 1 is controlled for the the new target opening position $\theta_S$. After that, the control unit 3 returns to the step 10 of FIG. 2.

FIG. 4 is a flow diagram showing a processing of reverse drive time calculation in the step 23 of FIG. 3.

The control unit 3 decides whether a reverse drive direction of the air-mix door 1 is the cooling direction or the heating direction in a step 230. If the air-mix door 1 is home-position-set for the full-hot position Pb, the reverse drive direction of the air-mix door 1 is the cooling direction. If the air-mix door 1 is home-position-set for the full-cool position Pa, the reverse drive direction of the air-mix door 1 is the heating direction. When the reverse drive direction is the cooling direction, that is, when the air-mix door 1 is home-position-set for the full-hot position Pb, the control unit 3 enters from the step 230 to a step 231, sets a reverse opening angle width $\theta_R$ from the full-hot position Pb to the new target opening position $\theta_S$ by $\theta_R = 100\% - \theta_S$, and enters a step 232. When the reverse drive direction is the heating direction, that is, when the air-mix door 1 is home-position-set for the full-cool position Pa, the control unit 3 enters from the step 230 to a step 233, sets the reverse opening angle width $\theta_R$ from the full-cool position Pa to the new target opening position $\theta_S$ by $\theta_R = \theta_S$, and enters the step 232.

In the step 232, a reference reverse drive time $t_R$ required for rotating the air-mix door 1 by the reverse opening angle width $\theta_R$ when a battery voltage is 12V is calculated by using a reference reverse drive time calculation map. The reference reverse drive time calculation map of the step 232 shows a relationship between an opening position of the air-mix door 1 (horizontal axis) and a drive time of the air-mix door 1 (vertical axis) when the motor actuator 2 is driven with a voltage of 12V. Since a torque of the motor actuator 2 is proportional to driving voltage, a time width required for rotating the air-mix door 1 by the reverse opening angle width $\theta_R$ differs from the reference reverse drive time $t_R$ when the battery voltage becomes above or below 12V by some reason. That is, if the battery voltage is above 12V, the time width required for rotating the air-mix door 1 by the reverse opening angle width $\theta_R$ is shorter than the reference reverse drive time $t_R$. Oppositely, if the battery voltage is below 12V, the time width required for rotating the air-mix door 1 by the reverse opening angle width $\theta_R$ is longer than the reference reverse drive time $t_R$. Because of this, the control unit 3 recognizes a current battery voltage $V_B$ by an input of the battery voltage information of a step 234, and gives the reverse drive time T by correcting the reference reverse drive time $t_R$ according to the current battery voltage $V_B$ in steps 235 and 236.

In the step 235, a correction value $t_C$ of a unit drive time corresponding to the current battery voltage $V_B$ is calculated by using a unit drive time correction value calculation map. The unit drive time correction value calculation map of the step 235 shows a relationship between a battery voltage (horizontal axis) and a correction value of a unit drive time required for rotating the air-mix door 1 by a unit opening angle (vertical axis). In this embodiment, the unit opening angle is 1%, and the unit drive time is a drive time width required for rotating the air-mix door 1 by the unit opening angle of 1% under a battery voltage of 12V. The correction value $t_C$ of the unit drive time is an increment/decrement of the unit drive time required for rotating the air-mix door 1 by the unit opening angle of 1% under the current battery voltage $V_B$. Accordingly, the correction value $t_C$ of the unit drive time is 0 if the current battery voltage $V_B$ is 12V, a plus value if the current battery voltage $V_B$ is below 12V, and a minus value if the current battery voltage $V_B$ is above 12V.

In the step 236, the reverse drive time T is calculated from the reference reverse drive time $t_R$, the reverse opening angle width $\theta_R$ and the correction value $t_C$ of the unit drive time by using the following calculation formula.

$$T = t_R + \theta_R \times t_C$$

According to a composition like this, if the potentiometer 8 for detecting the actual opening position of the air-mix door 1 causes a trouble, the air-mix door 1 is controlled for the new target opening position $\theta_S$ even when the new target opening position $\theta_S$ is other than the full-hot position Pb and full-cool position Pa. Thus, a comfortable air-conditioning feeling can be secured.

Further, each time it is necessary to control the air-mix door 1 for the new target opening position $\theta_S$ other than the the full-hot position Pb and full-cool position Pa, the home-position setting of the air-mix door 1 is executed, and the reverse drive time T is calculated so that a time error derived from a torque variation in the motor actuator 2 due to a battery voltage is corrected. Thus, a positional error of the air-mix door 1 can effectively be prevented.

Figure 5:
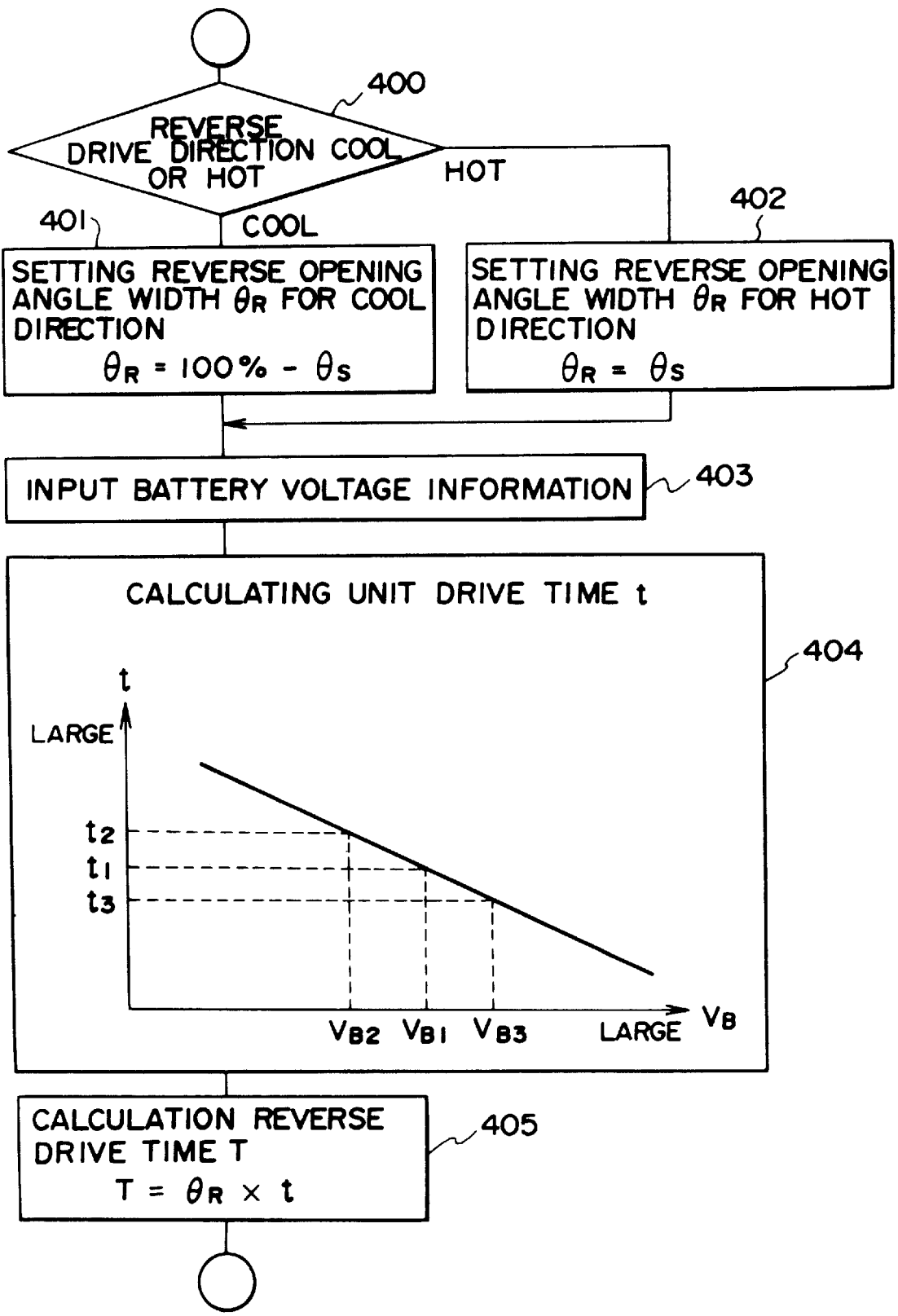
FIG. 5 is a flow diagram of the control unit of FIG. 1 showing a processing of step 23 of FIG. 3, and this is used in place of the flow diagram of FIG. 4.

FIG. 5 is a flow diagram showing another embodiment of the processing of reverse drive time calculation in the step 23 of FIG. 3, and this is used in place of the flow diagram of FIG. 4.

The control unit 3 decides whether a reverse drive direction of the air-mix door 1 is the cooling direction or the heating direction in a step 400. When the reverse drive direction is the cooling direction, the control unit 3 enters from the step 400 to a step 401, and sets a reverse opening angle width $\theta_R$ from the full-hot position Pb to the the new target opening position $\theta_S$ by $\theta_R = 100\% - \theta_S$. When the reverse drive direction is the heating direction, the control unit 3 enters from the step 400 to a step 402, and sets the reverse opening angle width $\theta_R$ from the full-cool position Pa to the the new target opening position $\theta_S$ by $\theta_R = \theta_S$.

Thereafter, the control unit 3 recognizes a current battery voltage $V_B$ by an input of the battery voltage information of a step 403, and in steps 404 and 405, gives the reverse drive time T which is corrected according to the current battery voltage $V_B$. In the step 404, the unit drive time t corresponding to the current battery voltage $V_B$ is calculated by using a unit drive time calculation map. The unit drive time calculation map of the step 404 shows a relationship between a battery voltage (horizontal axis) and a unit drive time required for rotating the air-mix door 1 by a unit opening angle (vertical axis). In this embodiment, the unit opening angle is 1%. The unit drive time t is a time width required for rotating the air-mix door 1 by the unit opening angle of 1% under the current battery voltage $V_B$. If the current battery voltage $V_B$ is $V_{B1}$, the unit drive time t is $t_1$. If the current battery voltage $V_B$ is $V_{B2}$ which is lower than $V_{B1}$, the unit drive time t is $t_2$ which is longer than $t_1$. If the current battery voltage $V_B$ is $V_{B3}$ which is higher than $V_{B1}$, the unit drive time t is $t_3$ which is shorter than $t_1$. In the step 405, the reverse drive time T is calculated from the unit drive time t and the reverse opening angle width $\theta_R$ by using the following calculation formula.

$$T = \theta_R \times t$$

Figure 6:
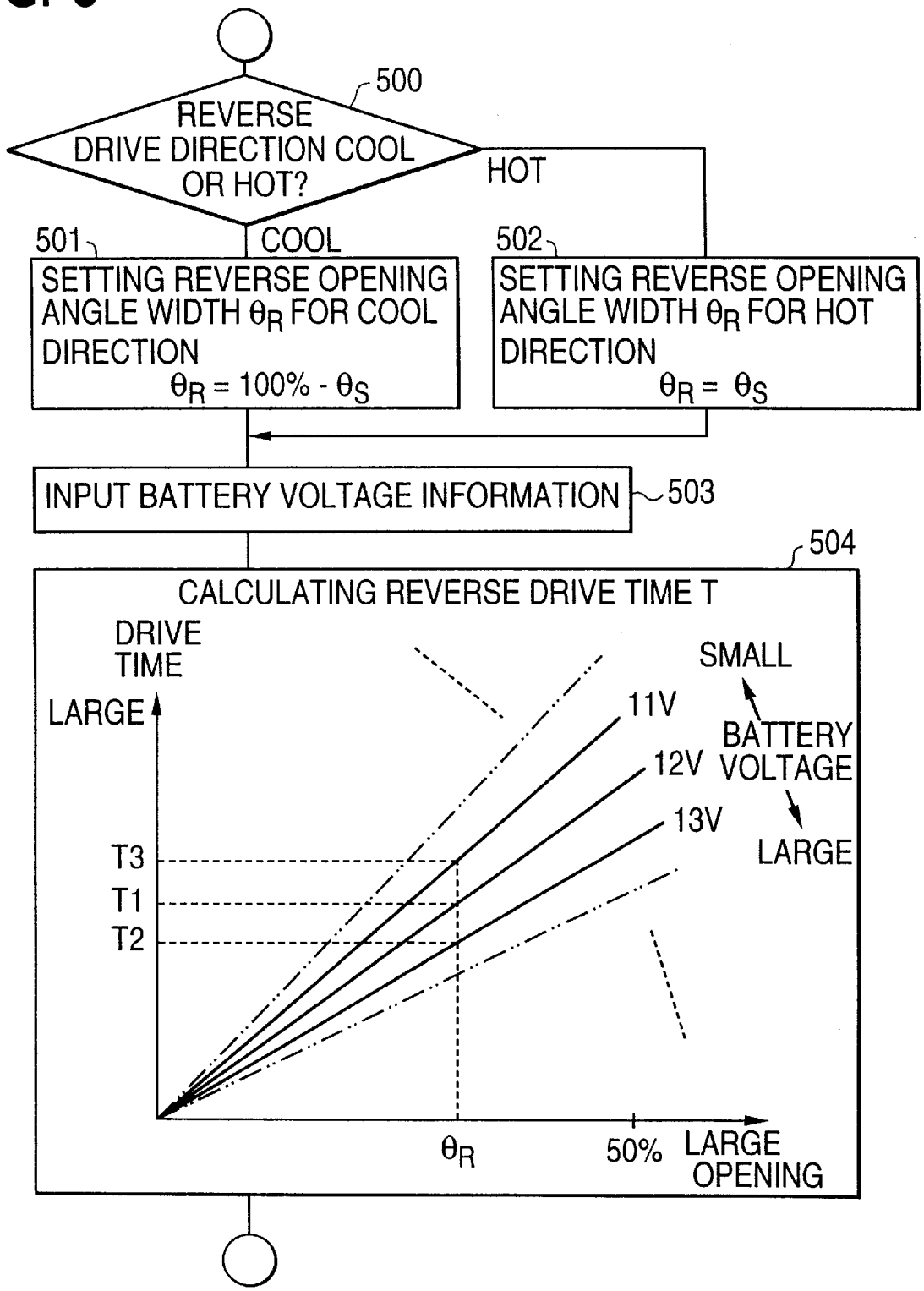
FIG. 6 is a flow diagram of the control unit of FIG. 1 showing a processing of step 23 of FIG. 3, and this is used in place of the flow diagrams of FIG. 4 and FIG. 5.

FIG. 6 is a flow diagram showing still another embodiment of the processing of reverse drive time calculation in the step 23 of FIG. 3, and this is used in place of the flow diagrams of FIG. 4 and FIG. 5.

The control unit 3 decides whether a reverse drive direction of the air-mix door 1 is the cooling direction or the heating direction in a step 500. When the reverse drive direction is the cooling direction, the control unit 3 enters from the step 500 to a step 501, and sets a reverse opening angle width $\theta_R$ from the full-hot position Pb to the the new target opening position $\theta_S$ by $\theta_R = 100\% - \theta_S$. When the reverse drive direction is the heating direction, the control unit 3 enters from the step 500 to a step 502, and sets the reverse opening angle width $\theta_R$ from the full-cool position Pa to the the new target opening position $\theta_S$ by $\theta_R = \theta_S$.

Thereafter, the control unit 3 recognizes a current battery voltage $V_B$ by an input of the battery voltage information of a step 503, and in a following step 504, gives the reverse drive time T which is corrected according to the current battery voltage $V_B$. In the step 504, the reverse drive time T required for rotating the air-mix door 1 by the reverse opening angle width $\theta_R$ under the current battery voltage $V_B$ is calculated by using a reverse drive time calculation map which shows a relationship of a battery voltage, an opening position of the air-mix door 1 and a drive time of the air-mix door 1. In the reverse drive time calculation map of the step 504, a horizontal axis is the opening position of the air-mix door 1, a vertical axis is the drive time of the air-mix door 1, and the battery voltage is parameter. In this embodiment, the reverse drive time calculation map shows the relationship of the opening position and the drive time at intervals of a unit voltage of 1V in plus and minus directions on the basis of 12V. If the current battery voltage $V_B$ is 12V, the reverse drive time T required for rotating the air-mix door 1 by the reverse opening angle width $\theta_R$ is $T_1$. If the current battery voltage $V_B$ is 13V which is higher than 12V, the reverse drive time T is $T_2$ which is shorter than $T_1$. If the current battery voltage $V_B$ is 11V which is lower than 12V, the reverse drive time T is $T_3$ which is longer than $T_1$. If the current battery voltage $V_B$ is an value between 12V and 11V, for example, the reverse drive time T is calculated by an interpolation calculation.

As described above, when it is necessary to control the air-mix door for the new target opening position other than the full-hot position or the full-cool position in case that the potentiometer for detecting the actual opening position of the air-mix door causes a trouble, the air-mix door is home-position-set for the full-hot or full-cool position. Then, the reverse drive time required for reversely driving the air-mix door from the home-position-set position to the new target opening position is calculated so that a time error derived from a torque variation of the motor actuator due to a battery voltage is corrected, and the air-mix door is reversely driven according to the reverse drive time. Because of this, even when the potentiometer causes trouble, the air-mix door is controlled for the new target opening position, and a comfortable air-conditioning feeling can be secured.

Further, each time it is necessary to control the air-mix door for the new target opening position other than the the full-hot position and full-cool position, the home-position setting of the air-mix door is executed, and the reverse drive time is calculated so that a time error derived from a torque variation in the motor actuator due to a battery voltage is corrected. Thus, a positional error of the air-mix door can effectively be prevented.

From foregoing it will now be apparent that a new and improved air-mix door control device for an automobile air-conditioning system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An air-mix door control device for an automobile air-conditioning system, having an opening position detector for detecting an opening position of an air-mix door, and controlling a motor actuator based on an opening position signal from said opening position detector so that said air-mix door is at a target opening position, comprising:

trouble detecting means for detecting trouble of said opening position detector;

home-position setting means, responsive to trouble detection of said trouble detecting means, for home-position-setting said air-mix door for a full-hot position or a full-cool position by controlling said motor actuator when it is necessary to set said air-mix door for a new target opening position other than the full-hot position or the full-cool position;

reverse drive time calculating means, responsive to said home-position setting means, for setting a reverse opening angle width of said air-mix door from the home-position-set position to the new target opening position, recognizing a current battery voltage, and calculating a reverse drive time required for reversely rotating said air-mix door by the reverse opening angle width based on the reverse opening angle width and the current battery voltage so as to correct a time error derived from a torque variation of said motor actuator due to a battery voltage; and reverse driving means, responsive to said reverse drive time calculating means, for reversely driving said air-mix door by the reverse drive time by controlling said motor actuator.

2. An air-mix door control device of claim 1, wherein said reverse drive time calculating means comprises:

reference reverse drive time calculating means for calculating a reference reverse drive time required for reversely driving said air-mix door by the reverse opening angle width based on a relationship between an opening position of the air-mix door and a drive time of the air-mix door under a prescribed voltage;

unit drive time correction value calculating means for calculating a correction value of a unit drive time corresponding to the current battery voltage based on a relationship between a battery voltage and the correction value of the unit drive time, the unit drive time being a time width required for rotating the air-mix door by a unit opening angle under the prescribed voltage, and the correction value being an increment/decrement of the unit drive time under the current battery voltage; and calculating means for calculating the reverse drive time from the reverse opening angle width, the reference reverse drive time and the correction value of the unit drive time.

3. An air-mix door control device of claim 2, wherein said calculating means calculates the reverse drive time according to the following calculation formula:

$$T = t_R + \theta_R \times t_C$$

, wherein T is the reverse drive time, $t_R$ is the reference reverse drive time, $\theta_R$ is the reverse opening angle width, and tc is the correction value of the unit drive time.

4. An air-mix door control device of claim 1, wherein said reverse drive time calculating means includes:

unit drive time calculating means for calculating a unit drive time corresponding to the current battery voltage based on a relationship of a battery voltage and the unit drive time, the unit drive time being a time width required for rotating the air-mix door by a unit opening angle; and calculating means for calculating the reverse drive time from the unit drive time and the reverse opening angle width.

5. An air-mix door control device of claim 4, wherein said calculating means calculates the reverse drive time according to the following calculation formula:

$$T = \theta_R \times t$$

, wherein T is the reverse drive time, $\theta_R$ is the reverse opening angle width, and t is the unit drive time.

6. An air-mix door control device of claim 1, wherein said reverse drive time calculating means calculates the reverse drive time required for reversely rotating the air-mix door by the reverse opening angle width under the current battey voltage based on a relationship of a battry voltage, an opening position of the air-mix door and a drive time of the air-mix door.

7. An air-mix door control device of claim 1, wherein said home-position setting means decides that it is necessary to set said air-mix door to the new target opening position other than the full-hot position or the full-cool position, when there is a change between the new target opening position and a preceding target opening position, and at the same time when the new target opening position is not the full-hot position or the full-cool position.

8. An air-mix door control device of claim 7, wherein said home-position setting means decides that it is necessary to set said air-mix door to the new target opening position other than the full-hot position or the full-cool position, when the preceding target opening position is not left, and at the same time when the new target opening position is not the full-hot position or the full-cool position.

9. An air-mix door control device of claim 1, wherein said home-position setting means decides whether the new target opening position is on the full-hot side or on the full-cool side, the home-position setting means sets said air-mix door to the full-hot position when the new target opening position is on the full-hot side, and home-position setting means sets said air-mix door to the full-cool position when the new target opening position is on the full-cool side.

10. An air-mix door control device of claim 9, wherein said home-position setting means sets said air-mix door by driving said air-mix door for a prescribed time which is determined based on a time width required for rotating said air-mix door from the full-hot position or the full-cool position to the full-cool position or the full-hot position.

11. An air-mix door control device of claim 1 further comprising full-hot/full-cool controlling means, responsive to the trouble detection of said trouble detecting means, for controlling said air-mix door to be set to the full-hot position or the full-cool position when the new target opening position is the full-hot position or the full-cool position.

* * * * *